Figure 1:
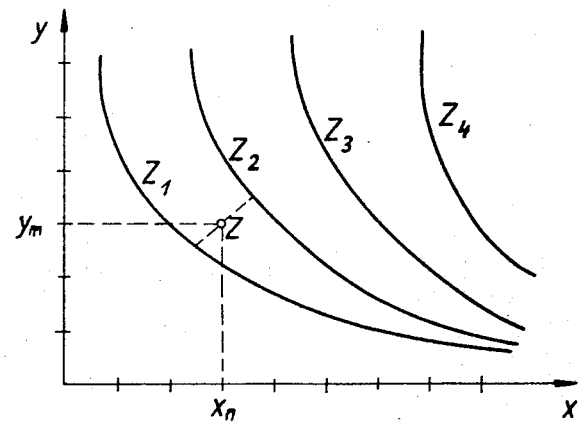

United States Patent [19]

Panschow

[11] 3,725,684
[45] Apr. 3, 1973

[54] DIGITAL/ANALOG LINEAR INTERPOLATOR

[76] Inventor: Rudolf K. H. Panschow, Wunstorfer Strasse 59, Hannover, Germany

[22] Filed: Nov. 13, 1970

[21] Appl. No.: 89,424

Related U.S. Application Data

[63] Continuation-in-part of Ser. No. 718,814, April 4, 1968, abandoned.

[52] U.S. Cl. .............................. 235/152, 235/150.53
[51] Int. Cl. .............................. G06f 7/38, G06j 1/00
[58] Field of Search .................. 235/152, 164, 150.53

[56] References Cited

UNITED STATES PATENTS

| | | | |
|---|---|---|---|
| 3,247,365 | 4/1966 | Dell et al. | 235/164 |
| 3,412,240 | 11/1968 | Hunt et al. | 235/164 |
| 3,373,273 | 3/1968 | Schubert | 235/150.53 X |
| 3,524,978 | 8/1970 | Miura et al. | 235/150.53 X |

Primary Examiner—Malcolm A. Morrison
Assistant Examiner—David H. Malzahn
Attorney—Woodhams, Blanchard and Flynn

[57] ABSTRACT

An electronic calculating machine for determination of a desired output quantity $z(x_e, y_e)$ related to a first input quantity $x_e$ variable within limits $x_o$ to $x_n$ and to a second input quantity $y_e$ variable within limits $y_o$ to $y_m$. The machine includes a first store storing permanently for each individual one of a series of fixed values $x_o$ to $x_n$ of the first input quantity the output quantities $z(x, y)$ for a series of fixed values $y_o$ to $y_m$ of the second input quantity. A reading device is provided for reading out from the first store the output quantities $z(x\nu, y \mu)$, $z(x\nu_{+1}, y \mu)$, $z(x\nu, y \mu_{+1})$ and $z(x\nu_{+1}, y \mu_{+1})$. An interpolation device is provided for forming, according to one of two preselected linear interpolation functions, as a first interpolated value one of the values $z(x \nu, y_e)$ and $z(x_e, y \mu)$ by linear interpolation between the two output quantities of one of the both pairs of output quantities $z(x\nu, y \mu)$ and $z(x\nu, y \mu_{+1})$ and $z(x\nu, y \mu)$, $z(x\nu_{+1}, y \mu)$, and as second interpolated value one of the both values $z(x\nu_{+1}, y_e)$ and $z(x_e, y \mu_{+1})$ by linear interpolation between one of the both pairs of output quantities $z(x\nu_{+1}, y \mu)$, $Z(x\nu_{+1}, y \mu_{+1})$ and $z(x\nu, y \mu_{+1})$, $z(x\nu_{+1}, y \mu_{+1})$ and in conjunction a third interpolated value $z(x_e, y_e)$ by linear interpolation between the first and second interpolated values. Means are provided for giving out the third interpolated value as the desired output quantity. The calculating machine forms sums and differences in a digital manner and products and quotients in an analog manner.

16 Claims, 7 Drawing Figures

$Z_1 < Z < Z_2$   if
$Z_1 < Z_2 < \ldots < Z_\infty$

DIGITAL/ANALOG LINEAR INTERPOLATOR

CROSS REFERENCE TO RELATED APPLICATION

This application is a continuation-in-part of my copending application Ser. No. 718,814, filed Apr. 4, 1968, and entitled ELECTRONIC COMPUTING APPARATUS, now abandoned.

The invention relates to electronic computing apparatus for the determination of a desired output quantity $z(x_e, y_e)$ which is dependent on a first given input quantity $x_e$ variable within the limits $x_o$ to $x_n$ and on a second given input quantity $y_e$ variable within the limits $y_o$ to $y_m$.

The determination of a quantity dependent on two independent variables is usually effected by reading from tables or curves. This type of determination however has the disadvantage that to obtain a high degree of accuracy, either a large amount of table work is necessary or curves having great smoothness must be used or interpolation must be effected between the values given in the tables or between the values of the parameters of the given curves. The accuracy obtained through interpolation by evaluating between the given values or between the values of the parameters of the curves is very small. To obtain a greater accuracy, interpolation must therefore be effected with smaller tables or curves by calculation by hand or with the aid of a scale.

Such a type of determination however is in the first place very time consuming and has in the second place the disadvantage of the possibility of error not only in reading but more particularly in interpolation.

Now it is known that these disadvantages and difficulties can be eliminated if an electronic computing machine is used for the determination of such a quantity dependent on two independent variables. Practically, however, it is a fact that for a reading accuracy of 0.1 percent i.e., a somewhat greater accuracy than that with the usual 30 cm slide rule, a digital calculating machine having a storage capacity of approximately 10 million bits and a correspondingly large expenditure for the control arrangements would be necessary and such an expenditure is not economically viable in most of the applications concerned.

On the other hand an electronic computing machine which would be produceable with a relatively low expenditure would be used for the determination of a quantity dependent on two independent variables with considerable advantage in many respects particularly in the control and storage technique where hitherto the control and regulation must be effected manually.

The invention, therefore, lies basically in the problem of providing an electronic calculating machine having a relatively small technical expenditure with which it is possible to determine a quantity dependent on two independent variables.

According to the invention, this is obtained with an electronic calculating machine which is characterized by a store in which for each individual one of a series of fixed values $x_o$ to $x_n$ of the first input quantity, the output quantities $z(x,y)$ for a series of fixed values $y_o$ to $y_m$ of the second input quantity are permanently stored; a reading device controlled by the input quantities for reading out from the store the output quantities $z(x_\nu, y_\mu)$ and $z(x_{\nu+1}, y_\mu)$ corresponding to the fixed values $x_\nu$ and $x_{\nu+1}$ lying next below and next above respectively the first input quantity $x_e$ for the value $y_\mu$ lying next below the second input quantity $y_e$ and for reading the output quantities $z(x_\nu, y_{\mu+1})$ and $z(x_{\nu+1}, y_{\mu+1})$ for the value $y_{\mu+1}$ lying next above the second input quantity $y_3$; an interpolating device which from the four output quantities $z(x_\nu, y_\mu)$, $z(x_{\nu+1}, y_\mu)$, $z(x_\nu, y_{\mu+1})$ and $z(x_{\nu+1}, y_{\mu+1})$ taken from the store, the four fixed values $x_\nu$, $x_{\nu+1}$, $y_\mu$, $y_{\mu+1}$ and from the two input quantities $x_e$ and $y_e$, forms by linear interpolation a first interpolated value $z(x_\nu, y_e)$ or $z(x_e, y_\mu)$ between two output values $z(x_\nu, y_\mu)$ and $z(x_\nu, y_{\mu+1})$ or $z(x_\nu, y_\mu)$ and $z(x_{\nu+1}, y_\mu)$ related to the same fixed values $x_\nu$ or $y_\mu$ and a second interpolated value $z(x_{\nu+1}, y_e)$ or $z(x_e, y_{\mu+1})$ between the two other output quantities $z(x_{\nu+1}, y_\mu)$ and $z(x_{\nu+1}, y_{\mu+1})$ or $z(x_\nu, y_{\mu+1})$ and $z(x_{\nu+1}, y_{\mu+1})$ and in conjunction a third interpolated value $z(x_e, y_e)$ between the first and second interpolated values $z(x_\nu, y_e)$ and $z(x_{\nu+1}, y_e)$ or $z(x_e, y_\mu)$ and $z(x_e, y_{\mu+1})$, either according to the expression $z(\xi_e, \eta) = z(\xi_k, \eta) + a(\xi_e - \xi_k)$ or according to the expression $z(\xi_e, \eta) = z(\xi_{k+1}, \eta) - a(\xi_{k+1} - \xi_e)$, the factor $a$ being equal to $(\{z(\xi_{k+1}, \eta) - z(\xi_k, \eta)\}(\xi_{k+1} - \xi_k))$ means for extracting the third interpolated value $z(x_e, y_e)$ as the desired output quantity, whereat the formation of sums and differences is effected in digital manner and the formation of quotients and products is effected in analog manner.

Advantageously the store consists of a replaceable information carrier whereby the relationship between the output and input quantities is variable. The values of the output quantity $z(x_o, y_o)$ to $z(x_n, y_m)$ are stored in digital form in the store.

In a preferred embodiment of the present calculating machine the information carriers forming the store are so constructed that the replaceable information carrier or carriers is or are in the form of a flat information carrier to which the values of the output quantities $z(x_o, y_o)$ to $z(x_n, y_m)$ are recorded in a plurality of adjacent columns and in that all values of the output quantities $z(x_\nu, y_o)$ to $z(x_\nu, y_m)$ associated with the same fixed value of the first input quantity are recorded in the succession of the fixed values of the second input quantity with which they are associated either in the same line or in the same column and that these lines or columns, in which all values of the output quantity associated with the same fixed value of the first input quantity are recorded, are arranged one below the other or one beside the other in the succession of the fixed values of the first input quantity.

Further the information carrier forming the store can advantageously be such that the values of the output quantity are stored on the replaceable information carrier in the form of binary groups and that punched tape or punched cards or film strips or bands having transparent and opaque areas as binary positions are used as information carriers.

Figure 2:
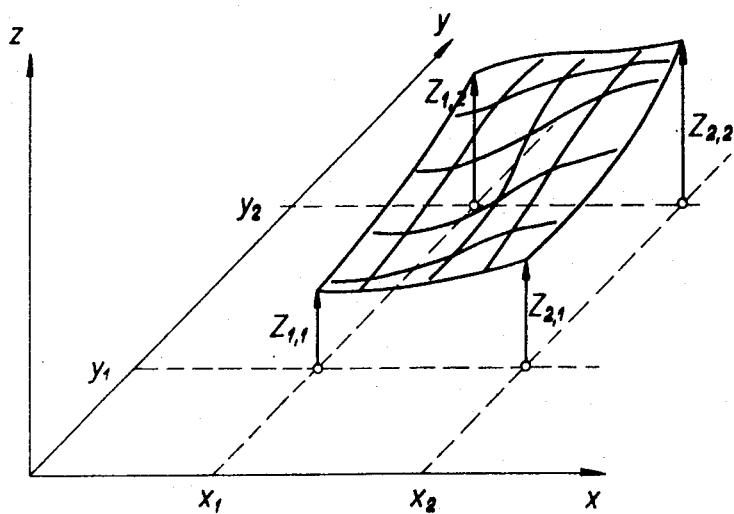
Figure 3:
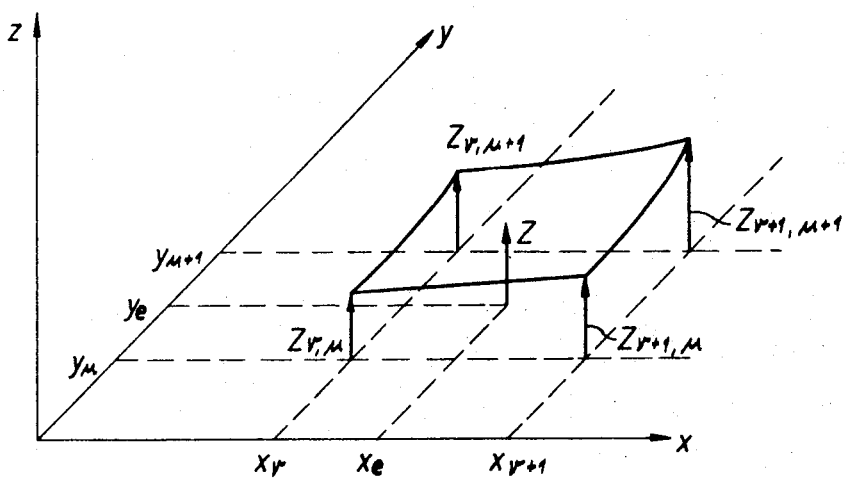
Figure 4:
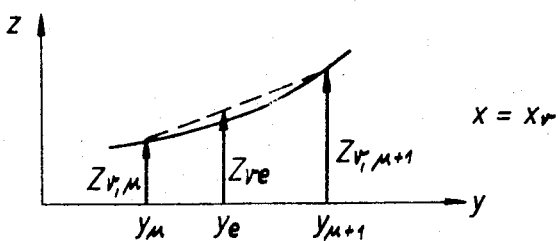

The invention is further explained as follows with reference to the accompanying drawings, of which FIG. 1 illustrates diagrammatically a quantity $z$ dependent on two independent variables $x$ and $y$, FIG. 2 illustrates a quantity $z$ dependent on two independent variables bles $x$ and $y$ in a three-coordinate system, FIG. 3 is a diagram similar to FIG. 2 and showing, in perspective a three-coordinate system in variables $x$, $y$ and $z$ for illustrating the operation of the present invention, FIG. 4 is a diagram in the $y, z$ plane of FIG. 3 corresponding to the value $x = x_\nu$.

Figure 5:
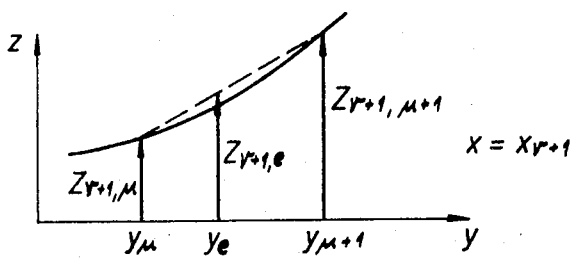
Figure 6:
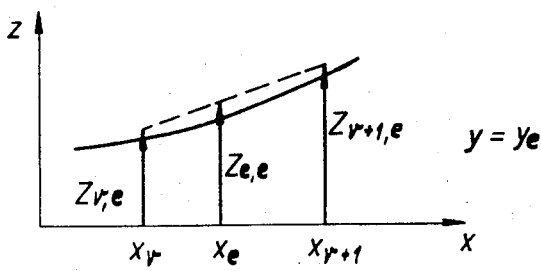
Figure 7:
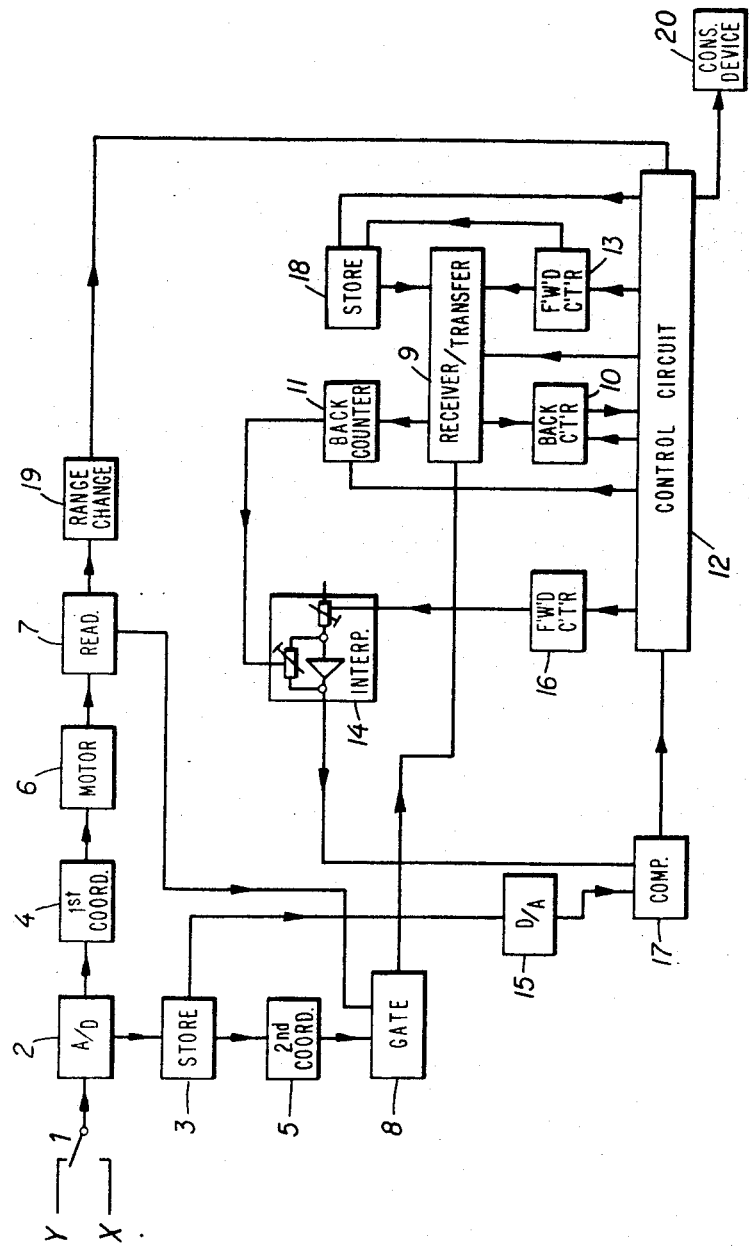

FIG. 5 is a diagram in the $y, z$ plane of FIG. 3 corresponding to the value $x = x_{\nu + 1}$, FIG. 6 is a diagram in the $x, z$ plane of FIG. 3 corresponding to the value $y = y_e$, and FIG. 7 shows a schematic block diagram of a calculating machine according to the invention.

For a diagrammatical illustration of the dependency of a dependent variable $z$ on two independent variables $x$ and $y$, the following two forms are most usual:

Firstly, a representation which combines two independent variables with a third dependent variable, may, as shown in FIG. 1, be diagrammatically illustrated in one plane by means of a group of curves.

A second possibility for showing the functional relationship is a perspective illustration in three coordinates $x, y, z$. Thus $z$ is the third dependent variable. If $z$ is a single-valued function of $x$ and $y$, then the $z$ value produces an associated surface which lies spatially over the $x, y$ plane. The distance of the surface above the $x,y$ plane corresponds to the value of the function $z$. FIG. 2 shows a part of such a surface.

For the following explanation of the principles of the present invention, from these both above mentioned forms the second is used, as can be seen from FIG. 3 to 6.

The present calculating machine operates, in principle, as follows:

The store of the present calculating machine is preferably a flat information carrier which contains the $z$-values for fixed tabular values of $x$ and $y$, i.e. for so-called median points. For example, the carrier contains the values $z(x_0,y_0)$ up to $z(x_n,y_m)$ in the following arrangement $z(x_0,y_0); z(x_0,y_1); \ldots$ up to $z(x_0,y_m)$
$z(x_1,y_0); z(x_1,y_1); \ldots$ up to $z(x_1,y_m)$ up to $z(x_n,y_0); z(x_n,y_1) \ldots$ up to $z(x_n, y_m)$ These $z$-values are stored on the information carrier in form of digital values, whereat the values $x_0$ to $x_n$ defining the $o^{th}$ to $n^{th}$ line of the shown arrangement and the values $y_0$ to $y_m$ defining the $o^{th}$ to $m^{th}$ column of the shown arrangement are normally not stored on said flat information carrier forming the store. For reading out the value $z(x_\nu,y_\mu)$ from the information carrier, there is taken the $z$-value being on line $\nu$ and in column $\mu$. The information carrier may be, for example, a film, a punched tape or punched card.

Operation is, in principle, as follows: Two variable input quantities $x_e$ and $y_e$, for example in the form of voltages, are applied to the inputs of the calculating machine and are converted there into digital values by an analog to digital converter. These digital values $x_e$ and $y_e$ are stored in intermediate stores. The value $x_e$ respectively $y_e$ in general does not coincide exactly with one of the values $x_0$ to $x_n$ respectively $y_0$ to $y_m$ but usually lies at a point between two values $x_\nu$ and $x_{\nu+1}$ respectively $y_\mu$ and $y_{\mu+1}$. The calculating machine now determines from the values $x_0$ to $x_n$ and $y_0$ to $y_m$ the two values $x_\nu$ and $x_{\nu+1}$ between which $x_e$ lies and the two values $y_\mu$ and $y_{\mu+1}$ between which $y_e$ lies. FIG. 3 shows an example of two given values $x_e$ and $y_e$ together with the assumed positions of the four values $x_\nu, x_{\nu+1}$ and $y_\mu, y_{\mu+1}$. The calculating machine then takes from said store the four $z$-values $z(x_\nu,y_\mu)$, $z(x_{\nu+1},y_\mu)$, $z(x_\nu,y_{\mu+1})$, $z(x_{\nu+1},y_{\mu+1})$ which corresponds to the median points $x_\nu/y_\mu, x_{\nu+1}/y_\mu, x_\nu/y_{\mu+1}, x_{\nu+1}/y_{\mu+1}$ and makes three linear interpolations to determine $z(x_e,y_e)$ from these four $z$-values.

The first interpolation is performed according to FIG. 4 in the $y, z$ plane having the parameter $x = x_\nu$. In this first interpolation the value $$z(x_\nu, y_e) = z(x_\nu, y_\mu) + \frac{z(x_\nu, y_{\mu+1}) - z(x_\nu, y_\mu)}{y_{\mu+1} - y_\mu} \cdot (y_e - y_\mu)$$

is calculated and stored.

The second interpolation is performed according to FIG. 5 in the $y, z$ plane having the parameter $x = x_{\nu+1}$.

In the second interpolation the value $$z(x_{\nu+1}, y_e) = z(x_{\nu+1}, y_\mu) + \frac{z(x_{\nu+1}, y_{\mu+1}) - z(x_{\nu+1}, y_\mu)}{y_{\mu+1} - y_\mu} \cdot (y_e - y_\mu)$$

is calculated and stored.

The third interpolation is performed according to FIG. 6 in the $x, z$ plane having the parameter $y = y_e$.

In this interpolation the value $$z(x_e, y_e) = z(x_\nu, y_e) + \frac{z(x_{\nu+1}, y_e) - z(x_\nu, y_e)}{x_{\nu+1} - x_\nu} \cdot (x_e - x_\nu)$$

is calculated and delivered as the required output quantity $z(x_e,y_e)$.

Within these interpolations the sums and differences are formed in digital manner by counting (digital calculating process), whereas the formation of products and quotients is performed in analog manner by means of an analog calculating amplifier whose external resistances (input resistance, cross-coupling resistance) are set automatically to values corresponding to the factors of these products and quotients, respectively. In the preferred embodiment shown the formation of the quotients is simplified, in actuality eliminated, by making the differences $(x_{\nu+1} - x_\nu)$ and $(y_{\mu+1} - y_\mu)$ equal to one, as hereinafter discussed.

Construction and operation of an embodiment of the present calculating machine are set forth in more detail with reference to FIG. 7 showing a schematic block diagram of this embodiment.

The embodiment of the present calculating machine shown in FIG. 7 includes the following details. An input X for the analog input quantity $x_e$ and an input Y for the analog input quantity $y_e$ are provided. An analog-digital converter 2 converts said analog quantities one after the other into multi-digit digital values and an input changeover switch 1 connects the analog input of the analog-digital converter 2 either with the Y-input or with the X-input. Means for splitting (like the splitting of a decimal fraction by a decimal point into a whole number having one or more digits and the decimal places) each of the multi-digit digital values into a digital coarse value formed by one or more significant digits and a digital fine value formed by the remainder of the digits of said multi-digit digital value are provided. These last mentioned means are formed by two intermediate stores for said digital values of $x_e$ and $y_e$, each of said intermediate stores comprising a number of stages corresponding to the number of digits of said digital values and storing in a first part of said stages said more significant digits and in the rest of said stages said remainder of the digits, thereby splitting said digital values each into a digital coarse value and a digital fine value. One of said intermediate stores is formed by block 3 and the other by a counter within the analog-digital converter 2. Further, the embodiment in FIG. 7 includes an information carrier which is arranged within a reading device 7 and on which $z$-values are permanently stored in the above mentioned arrangement. Each of these $z$-values is associated with one of the fixed values $x_o$ to $x_n$ which follow one another at equal intervals $\Delta x$. Each of these intervals $\Delta x$ corresponds to one unit of the least significant digit of the digital coarse value of the input quantity $x_e$, and further each of these $z$-values is associated with one of the fixed values $y_o$ to $y_m$ which follow one another at equal intervals $\Delta y$. Each of these intervals $\Delta y$ corresponds to one unit of the least significant digit of the digital coarse value of the input quantity $y_e$. In other words, the converting relation of converter 2 is chosen so that the digital value of $x_e$ respectively $y_e$ changes exactly by one unit of the digital coarse value of $x_e$ respectively $y_e$ if the analog value $x_e$ respectively $y_e$ changes by $\Delta x$ respectively $\Delta y$. Further in the embodiment in FIG. 7 $n$ is equal to the maximum value of the digital coarse value of the input quantity $x_e$ and $m$ is equal to the maximum value of the digital coarse value of the input quantity $y_e$, i.e. with a digital value of $x_e$ respectively $y_e$ being $n$ respectively $m$ there is represented the maximum analog value $x_e = x_n = 0 \ x_o + n\Delta x$ respectively $y_e = y_m = y_o + m\Delta y$, and since the digital value of $x_e$ resp. $y_e$ changes by one unit with a changing of analog $x_e$ resp. $y_e$ by $\Delta x$ resp. $\Delta y$, the digital value of $x_e = x_o = x_n - n\Delta x$ resp. of $y_e = y_o = y_m - m\Delta x$ is zero. In other words, the converting relation of converter 2 is further chosen so that the digital value of $x_e$ resp. $y_e$ is zero, if the analog value $x_e$ resp. $y_e$ is $x_o$ resp. $y_o$. The embodiment in FIG. 7 further includes control means 4, 5, 6 and 8 (hereinafter discussed) for the reading device 7 which control means themselves are controlled by the digital coarse values of the input quantities $x_e$ and $y_e$ in such a manner (which is explained in more detail above) that the reading device 7 is set, with a digital coarse value $\nu$ of the input quantity $x_e$ and a digital coarse value $\mu$ of the input quantity $y_e$, by means of a first coordinator 4 simultaneously or successively either on the series of output quantities $z(x_\nu,y_o)$ to $z(x_\nu,y_m)$ and $z(x_{\nu+1},y_o)$ to $z(x_{\nu+1},y_m)$ or on the series of output quantities $z(x_o,y_\mu)$ to $z(x_n,y_\mu)$ and $z(x_o, y_{\mu+1})$ to $z(x_n,y_{\mu+1})$. Then, from these series, by means of a second coordinator 5 the pairs of output quantities $z(x_\nu,y_\mu)$, $z(x_\nu,y_{\mu+1})$ and $z(x_{\nu+1},y_\mu)$, $z(x_{\nu+1},y_{\mu+1})$ resp. the pairs of output quantities $z(x_\nu,y_\mu)$, $z(x_{\nu+1},y_\mu)$ and $z(x_\nu,y_{\mu+1})$, $z(x_{\nu+1},y_{\mu+1})$ are extracted. Further in the embodiment in FIG. 7 means are provided for transferring to the interpolation device 9 to 18 the extracted pairs of output quantities over the connection between the blocks 8 and 9 and further the digital fine value of the input quantity $x_e$ formed by the digital value of the difference $(x_e - x_\nu)$ and the digital fine value of the input quantity $y_e$ formed by the digital value of the difference $(y_e - y_\mu)$ over the connection between blocks 3 and 15.

In the embodiment in FIG. 7 the steps $\Delta x$ and $\Delta y$ are chosen so that they are equal. This is advantageous since in this case the converting relation of the analog-digital converter 2 is the same for converting $x_e$ as for converting $y_e$. Naturally it would also be possible to make the steps $\Delta x$ and $\Delta y$ different from each other, but in this case the converting relation of converter 2 must be switched over simultaneously with switching over input changeover switch 1, and in consequence of that a higher expenditure would be necessary. It is further advantageous if the digital value of $x_e = x_n$, i.e. the digital value $n$, and the digital value of $y_e = y_m$, i.e. the digital value $m$, are equal, since in this case an optimum of accuracy is achievable with the present calculating machine by fully utilizing the capacity of said both intermediate stores and of said information carrier and the reading device with its control means. A corresponding adaption of the magnitude of $x_n$ or $y_n$ can, for example, be performed before the X- or Y-input.

The reading device 7 and its control means 4, 5, 6, 8 are in the embodiment of the present calculating machine shown in FIG. 7 constructed in particular so that the reading device 7 comprises a number of groups of reading members each of which can read the value of an output quantity and together they can read all the values of the output quantities arranged either in a line or in a column, and that the control means for the reading device 7, comprise firstly a motor 6 controlled by the first coordinator 4 for moving the information carrier relatively to the reading members in a column direction for a line arrangement of the groups of reading members or in a line direction for a column arrangement of the groups of reading members and for applying the series of output quantities associated either with the fixed values $x_\nu$ and $x_{\nu+1}$ or with the fixed values $y_\mu$ and $y_{\mu+1}$ in succession to the reading members, and that the control means for the reading device 7 comprise secondly a gate circuit 8 controlled by the second coordinator 5 for the connection of both the groups of reading members associated with the fixed values $y$ and $y_{\mu+1}$ resp. with fixed values $x_\nu$ and $x_{\nu+1}$ to the above mentioned transfer means.

Alternatively, the reading device and the associated control means, due to another advantageous form of the present calculating machine not shown in the drawings, can be constructed so that the reading device comprises four groups of reading members each of which can read the value of an output quantity and together they can read the two values of output quantities occurring one after the other in the same line and the two values of output quantities in the same columns of the next line and in that the control means for the reading device comprises in the first place a first motor controlled by the first coordinator for moving the information carrier relatively to the reading members in the column direction and for applying the line of the output quantities associated with the fixed value $x_\nu$ or $y_\mu$ to the both groups of reading members forming the first line of reading members and in the second place a second motor controlled by the second coordinator for moving the information carrier relatively to the reading members in the line direction and for applying the column of output quantities associated with the fixed value $y_\mu$ or $x_\nu$ to both the groups of reading members forming the first column of reading members.

For a better understanding, in the following is given an example of the operation of the control means 4, 5, 6 and 8 for the reading device 7 of the embodiment shown in FIG. 7 : It shall be supposed that the analog values $x_e$ and $y_e$ are, for example,
$x_e = x_o + 5.25 \Delta x = x_o + 5\ 8/32\ \Delta x$ and
$y_e = y_o + 3.75 \Delta y = y_o + 3\ 24/32\ \Delta y$. Then the analog-digital converter 2 converts (according to its above explained converting relation) the analog value $x_e$ into the digital value 5 8/32 and the analog value $y_e$ into the digital value 3 24/32. From these digital values the first is stored into the intermediate store 3 and the second rests in the counter of the converter 2. The intermediate store 3 and the counter of converter have each, for example, eight binary stages from which five are for the digital fine value and the following three are for the digital coarse value. Therefore, after converting firstly $y_e$ and secondly $x_e$ by converter 2 into digital values, in the intermediate store 3 there is stored the value 3 24/32, that is, in the three stages for the digital coarse value the value 3 resp. the binary value 011 and in the five stages for digital fine value the value 24 resp. the binary value 11000 (is, this value 24 represents 24/32 is given by the fact that there are five stages for the digital fine value so that one unit of the digital fine value is $\frac{1}{2}^5 = 1/32$). Further in the counter of converter 2 there is stored the value 5 8/32, that is, in the three stages for the digital coarse value the value 5 resp. the binary value 101 and in the five stages for the digital fine value the value 8 resp. the binary value 01000. Since the counter of converter 2 and the intermediate store 3 each have, in the example above, three binary stages for the digital coarse values of $x_e$ resp. $y_e$, the maximum values of the digital coarse values of $x_e$ and $y_e$ are 7, and therefore in the embodiment in FIG. 7 $n$ and $m$ are, as said above, equal to 7, i.e., on said information carrier arranged within reading device 7 there are stored permanently the z-values $z(x_o,y_o)$ up to $z(x_7,y_7)$ in an arrangement as shown above having eight lines associated with $x_o$ to $x_7$ and eight columns associated with $y_o$ to $y_7$. Now, as also mentioned above, for controlling the reading device only the digital coarse values of $x_e$ and $y_e$, i.e. in the present example the coarse value 3 in the intermediate store 3 and the coarse value 5 in the counter of converter 2, are used. By means of the coarse value 5 being in the counter of converter 2, the fifth line of the information carrier, where the z-values $z(5,y_o)$ to $z(x_5,y_7)$ are stored, is set under said groups of reading members of reading device 7. This is done by coordinator 4 and motor 6. Coordinator 4 has the usual function of coordinators, i.e. it energizes or deenergizes the $k^{th}$ of its output lines when digital value $k$ is given to its input, and it may be therefore constructed in usual manner, for example, in form of a diode matrix. In the present example coordinator 4 has, corresponding to the possible digital values 0 to 7 at its input, eight output lines, the fifth of which becomes deenergized (according to digital value 5 at its input) and all other, i.e., the $0^{th}$ to fourth, sixth, and seventh output line, remain energized. The eight output lines of coordinator 4 are connected with motor 6 and associated with eight positions of the rotor of motor 6, for example by an eight-piece commutator. Since only the fifth of these output lines is deenergized, rotor of motor 6 goes to the fifth position thereby setting the fifth line of the information carrier under said groups of reading members of reading device 7. These reading members are connected with gate circuit 8 which is controlled by coordinator 5. Coordinator 5 is controlled by said coarse value 3 being in the intermediate store 3. In the present example coordinator 5 has, corresponding to the possible digital values 0 to 7 at its input, eight output lines, the third of which becomes energized (according to digital value 3 at its input) and all other, i.e. the $0^{th}$ to second and fourth to seventh, remain deenergized. The eight output lines of coordinator 5 are connected with gate circuit 8 and each of these output lines (e.g. the third) is associated with the gates for the corresponding (e.g. the third) and the next (e.g. the fourth) group of said reading members. Therefore with said energizing of the third output line of coordinator 5, the gates for the third and the fourth group of reading members are opened so that from the above mentioned z-values $z(x_5, y_o)$ to $z(x_5,y_7)$ selected by means of coordinator 4 and motor 6 the both z-values $z(x_5,y_3)$ and $z(x_5,y_4)$ can pass to the output of gate circuit 8 and from there into the interpolation device 9 to 18. With these two z-values $z(x_5,y_3)$ and $z(x_5,y_4)$ and with the digital fine value of $y_e$ stored in said five fine value stages of intermediate store 3, the interpolation device 9 to 18 then carries out said first interpolation and determines $z(x_5,y_e)$ which is stored within the interpolation device.

Then the digital coarse value stored in the counter of converter 2 is increased by one unit, so that this coarse value becomes 6 and therefore the sixth output line of coordinator 4 is deenergized and simultaneously the fifth output line of coordinator 4 (which was deenergized before) is energized thereby causing rotor of motor 6 to go to the sixth position and to set the sixth line of the information carrier under said group of reading members. Therefore at the output of gate circuit 8 then appear $z(x_6,y_3)$ and $z(x_6,y_4)$. With these two z-values and the digital fine value of $y_e$ stored in intermediate store 3 then the interpolation device 9 to 18 carries out said second interpolation and determines $z(x_6,ay_e)$.

Then the digital fine value of $x_e$ stored in said five fine value stages of the counter of converter 2 is transferred to the fine value stages of intermediate store 3 and with this digital fine value of $x_e$ and the z-values $z(x_5,y_e)$ and $z(x_6,y_e)$ present within the interpolation device the interpolation device 9 to 18 then carries out said third interpolation and determines $z(x_e,y_e)$.

As can be seen from the example above, by the control means 4, 5, 6, and 8 there are selected automatically the four z-values $z(x_5,y_3)$, $z(x_5,y_4)$, $z(x_6,y_3)$, and $z(x_6,y_4)$ associated with the two fixed x-values $x_5$ and $x_6$ and with the two fixed y-values $y_3$ and $y_4$ lying next below and next above $x_e$ resp. $y_e$ (digital $x_e = 5\ 8/32$ lying between digital $x_6 = 6$ and digital $x_5 = 5$, and digital $y_e = 3\ 24/32$ lying between digital $y_4 = 4$ and digital $y_3 = 3$). However, there are no special means for finding out said fixed x- and y-values lying next below and next above $x_e$ and $y_e$, since the digital coarse values of $x_e$ and $y_e$ are already the fixed values $x_5$ and $y_3$ lying next below $x_e$ resp. $y_e$, and the fixed values $x_6$ and $y_4$ lying next above $x_e$ resp. $y_e$ result from these coarse values by simply increasing them by one unit. The feature which makes unnecessary such special means for finding out said fixed x- and y-values is the above explained converting relation of analog digital converter 2 in connection with said splitting of the digital values of $x_e$ and $y_e$ into digital coarse and digital fine values. The control means for the reading device 7, i.e. the coordinators 4 and 5, motor 6, and gate circuit 8, are of conventional structure and may also be replaced by other conventional means, since for selecting of the four crossover points of two lines of two columns with given values (respectively numbers of said lines and columns) there are many possibilities in the state of the art.

For providing said control means 4, 5, 6, and 8 for reading device 7 with the digital coarse values of $x_e$ and $y_e$ and said interpolation device 9 to 18 with the digital fine values of $x_e$ and $y_e$, the part of the embodiment in FIG. 7 embracing switch 1 and blocks 2 and 3 comprises in particular the following details: Said inputs X and Y for the input quantities $x_e$ and $y_e$ given in the form of analog values; said input change-over switch 1; said analog/digital converter 2 for converting at first the analog value of input quantity $y_e$ and then, after changing over switch 1, the analog value of input quantity $x_e$ into multi-unit digital values and for storing the determined digital value of $x_e$ until its further manipulation within the calculating machine (switch 1 may also be included with converter 2 and may be changed over automatically after converting $y_e$); connecting means between the coarse value positions of the digital output of the analog/digital converter 2 and the input of said first coordinator 4 for transferring the digital coarse value of $x_e$ from the analog digital converter 2 to the first coordinator 4 ; said intermediate store 3 for storing the digital value of $y_e$ during said first and second interpolation and for storing the digital fine value of $x_e$ during said third interpolation ; connecting means between the digital output of the analog/digital converter 2 and the input of the intermediate store 3 for transferring from converter 2 to intermediate store 3 for digital value of $y_e$ and the digital fine value of $x_e$ ; connecting means between the coarse value positions of the output of intermediate store 3 and the input of said second coordinator 5 for transferring the digital coarse value of $y_e$ from the intermediate store 3 to the second coordinator 4; and connecting means between the fine value positions of the output of intermediate store 3 and block 15 of the interpolation device for transferring the digital fine values of $y_e$ and $x_e$ from intermediate store 3 to block 15 of the interpolation device.

An important point for the construction of the interpolation device 9 to 18 in the embodiment in FIG. 7 is that the z-values stored on said information carrier are, as mentioned above, chosen so that each of these z-values is associated with one of a number of values $x_o$ to $x_n$ of the input quantity $x_e$ following one another in equal intervals $\Delta x = x_{\nu+1} - x_\nu$ and with one of a number of values $y_o$ to $y_m$ of the input quantity $y_e$ following one another in equal intervals $\Delta_y = y_{\mu+1} - y_\mu$. More particularly, with this choice of the values $x_o$ to $x_n$ and $y_o$ to $y_m$, the divisor $(\xi_{k+1} - \xi_k)$ in the quotient $(\{z(\xi_{k+1},\eta) - z(\xi_k,\eta)\} (\xi_{k+1} - \xi_k))$ to be formed for each one of said three interpolations is a constant which is independent of $k$ and is equal to $\Delta x$ if $\xi$ represents the variable $x$ and is equal to $\Delta y$ if $\xi$ represents the variable $y$. This divisor is in the embodiment in FIG. 7 equal to 1, since , as mentioned above, $\Delta x = \Delta y = 1$. Therefore, in the embodiment in FIG. 7, for each of said three interpolations said quotient is formed by the difference $\{z(\xi_{k+1}, \eta) - z(\xi_k,\eta)\}$ and no division by $(\xi_{k+1} - \xi_k)$, i.e. by $(y_{\mu+1} - y\mu)$ or by $(x_{\nu+1} - x_\nu)$, is necessary so that the formation of the interpolated values is substantially simplified.

The interpolation device 9 to 18, in the embodiment of the present calculating machine shown in FIG. 7, includes a receiver/transfer circuit 9 connected with the means for transferring from gate circuit 8 the pair of z-values extracted from the information carrier. A first backward counter 10 has a setting input connected with the receiver/transfer circuit 9. Into such counter 10 for each of said three interpolations, the smaller z-value of the pair of z-values forming the interpolation limits of the interpolation is transferred by the receiver/transfer circuit 9. A second backward counter 11 has a setting input connected with the receiver/transfer circuit 9. Into such counter 11 for each of said three interpolations, the larger z-value of the pair of z-values forming the interpolation limits of the interpolation is transferred by the receiver/transfer circuit 9. A first forward counter 13, has an output connected with the receiver/transfer circuit 9, for determining the interpolated z-value of the interpolation being carried out. A store 18 has an input connected with an output of said first forward counter 13 and the output connected with the receiver/transfer circuit 9, for storing the interpolated z-value of said first interpolation during said second interpolation. A second forward counter 16 is connected to an interpolator 14. The interpolator 14 produces on its output a step voltage increasing linearly with the state of count of the second forward counter 16. The mean increase of said step voltage is inversely proportional to the difference $\Delta z$ between the larger and the smaller z-value of the pair of z-values forming the interpolation limits of the interpolation being carried out. A first control input of the interpolator 14 provided for setting the mean increase of the step voltage is connected with the output of the second backward counter 11 and a second control input of the interpolator 14 provided for the step-by-step increment of the step voltage is connected with the output of the second forward counter 16. The interpolation device 9 to 18 comprises further a digital-analog converter 15 whose input is connected with the means for transferring from intermediate store 3 the digital fine values of the input quantities $y_e$ and $x_e$. The converter 15 produces an output voltage increasing linearly with the digital fine values at its input. The potential of the output voltage of converter 15 is, with a digital fine value at its input being zero, equal to the potential of the output step voltage of interpolator 14 at a counting position of the second forward counter 16 being zero and is further, with a digital fine value of the magnitude $\alpha x$ or $\Delta y$ at its input, equal to the potential of the output step voltage of interpolator 14 at a counting position $\Delta z$ of the second forward counter 16. A comparator 17, the one input of which being connected with the output of the interpolator 14 and the other input of which being connected with the output of the digital-analog converter 15, compares the output step voltage of interpolator 14 with the output voltage of the digital-analog converter 15 and generates an output signal as soon as the output step voltage of interpolator 14 has reached the value of the output voltage of the digital-analog converter 15. The interpolation device 9 to 18 comprises further a control circuit 12 provided with a counting impulse generator. The control circuit 12 is connected with the output of the comparator 17 and with the counting inputs of both forward counters 13 and 16 and of both backward counters 10 and 11 and with the output of the first backward counter 10 and with a control input of the receiver/transfer circuit. The control circuit 12 delivers for the formation of each individual one of said three interpolated values $z(x_\nu, y_e)$, $z(x_{\nu+1}, y_e)$, $z(x_e, y_e)$, after the transfer of the pair of z-values forming the interpolation limits of the respective interpolation to the backward counters 10 and 11, counting impulses simultaneously to the counting inputs of the both backward counters 10 and 11 and to the counting input of the first forward counter 13 Such continues until the first backward counter 10, in the moment of reaching the counting position zero, delivers to the control circuit 12 a stop signal, which terminates said delivery of counting impulses to the backward counters 10 and 11. In this moment the second backward counter 11 contains the difference $\Delta z$ between the larger and the smaller z-value and the first forward counter 13 contains the smaller z-value of said pair of z-values forming the interpolation limits of the interpolation being carried out. The control circuit 12 then delivers counting impulses simultaneously to the counting inputs of the first and second forward counters 13 and 16 until it receives said output signal of the comparator 17 which stops the delivery of counting impulses to the forward counters 13 and 16. In this moment the first forward counter 13 contains the interpolated z-value of the completed interpolation. The control circuit 12 delivers further, at the beginning of each of said three interpolations, to the receiver/transfer circuit 9 a control signal. Such control signal causes within the first and second interpolation the transfer of the first and second respectively pair of z-values, obtained from the reading device 7 to the backward counters 10 and 11 and within the third interpolation the transfer of the pair of z-values third store 18 and within the first forward counter 13 to the backward counters 10 and 11. Further the control circuit 12 delivers at the end of each of said three interpolations cancel signals for cancelling the second backward counter 11 and the second forward counter 16 and at the end of said first interpolation a control signal for transferring the content of the first forward counter 13 into the store 18 and at the end of said third interpolation a control signal for transferring the content of the first forward counter 13 to the output of the calculating machine or for cancelling the first forward counter 13. (The content of counter 13 at the end of the third interpolation represents the desired output quantity $z(x_e, y_e)$). Since the three time points, at which the control circuit 12 delivers control and/or cancel signals and begins or finishes to deliver counting impulses from its included counting impulse generator, are given by the appearance of input signals of control circuit 12, namely the end of each interpolation and the beginning of the next interpolation (by said output signal of comparator 17 delivered as input signal to control circuit 12) and the time point at which counter 10 reaches zero (by said stop signal of counter 10 delivered as input signal to control circuit 12), structure of control circuit 12 is a matter of ordinary skill. In the embodiment in FIG. 7 the control circuit 12 is constructed so that said control and cancel signals delivered by the control circuit 12, except the control signal to be delivered to the receiver/transfer circuit 9 at the beginning of the first interpolation in the moment of switching on the calculating machine, are all formed by the output signal of the comparator 17. In the moment of switching on the calculating machine a start signal is delivered to the control circuit 12 from which the control signal is delivered which at the beginning of the first interpolation is to be delivered to the receiver/transfer circuit 9.

The interpolator 14 comprises a voltage amplifier with variable amplification factor and variable input voltage. The amplification factor is adjusted by the second back-ward counter 11 to a value $C/\Delta z$, which value is, with the proportionality factor C being smaller or at most equal to the maximum amplification factor of the amplifier, inversely proportional to the difference between the larger and the smaller z-value of the pair of z-values forming the interpolation limits of the interpolation being carried out. The input voltage is zero at the counting position zero of the second forward counter 16 and is increased with each counting step of the second forward counter 16 by a voltage value being equal to the product of 1/C and the voltage difference between the output voltages of the digital-analog converter 15 for an input digital fine value of $\Delta x$ or $\Delta y$ and for an input digital fine value of zero.

For the determination of output quantities z whose relationship $z(x,y)$ with x and y is a function not monotonously increasing with x and y and not monotonously decreasing with x and y, the following further means are necessary in the interpolation device 9 to 18: Means for generating a second output voltage decreasing linearly with the input digital fine value of digital-analog converter 15, the potential of which output voltage being, for an input digital fine value of zero, equal to the potential of the output step voltage of interpolator 14 for a count position $\Delta z$ of the second forward counter 16 and being further, for an input digital fine value of $\Delta x$ or $\Delta y$, equal to the potential of the output step voltage of interpolator 14 for a counting position zero of the second forward counter 16; switching means for applying either the linearly decreasing output voltage or the linearly increasing output voltage to the output of the digital-analog converter 15; a comparison circuit for comparing the two z-values of the pair of z-values forming the interpolation limits of the interpolation being carried out, which comparison circuit controls the switching means for applying either the linearly decreasing output voltage or the linearly increasing output voltage to the output of the digital-analog converter 15 so that the linearly increasing output voltage is applied if the z-value of the pair of z-values associated with the lower x- or y-value is transferred into said first backward counter 10 and the z-value of the pair of z-values associated with the upper x- or y-value is transferred into said second backward counter 11 and that the linearly decreasing output voltage is applied if the z-value of the pair of z-values associated with the upper x- or y-value is transferred into said first backward counter 10 and the z-value of the pair of z-values associated with the lower x- or y-value is transferred into said second backward counter 11; and a coordinator controlled by said comparison circuit which causes the transfer of the smaller z-value of the pair of z-values to the first backward counter 10 and the transfer of the larger z-value of the pair of z-values to the second backward counter 11. In this case the receiver/transfer circuit 9 is constructed so that the receiver/transfer circuit 9 conveys the z-value of the pair of z-values associated with the lower x-or y-value to one input of the comparison circuit and the z-value of the pair of z-values associated with the upper x- or y-value to the other input of the comparison circuit and that the coordinator connects the setting input of the first backward counter 10 to the input of the comparison circuit having the smaller z-value and the setting input of the second backward counter 11 to the input of the comparison circuit having the larger z-value and that the comparison circuit delivers a control signal to said output voltage switching means of the digital-analog converter 15 if the smaller z-value of the pair of z-values is conveyed to said other input of the comparison circuit, said control signal causes said switching means to changeover from said linearly increasing output voltage to said linearly decreasing output voltage.

If the desired output quantity shall be given out in the form of an impulse series, the control circuit 12 provided in the interpolation device 9 to 18 may be further constructed so that the control circuit 12 connects, at the beginning of the formation of the third interpolation value, an output lead in parallel with the counting input of the first forward counter 13 over which the third interpolation value forming the desired output quantity $z(x_e, y_e)$ is delivered out of the calculating machine in the form of an impulse series.

In order to attain a high accuracy of the output quantities $z(x_e, y_e)$ also with greater variations in value of the z-values permanently stored at said information carrier, and that in particular also in the range of smaller z-values, which do not take up the entire store capacity available for a z-value at said information carrier, the present calculating machine may advantageously be constructed so that the z-values are stored in one or more marked zones of the information carrier in the form of an integer-multiple at their real values and that the third interpolation value is lead in form of an impulse series over a line in which one or more impulse frequency dividers are switched in so that the dividers cause together an impulse division factor corresponding to said integer of said integer-multiple, said switching in of the impulse frequency divider or dividers being controlled by said zone markings which are read by reading device 7 and are identified by range change-over switch 19 which causes said switching in of said dividers according to the identified marking. Said line with said dividers may be included within the control circuit 12.

In summary, the operation of the embodiment in FIG. 7 is as follows:

At first the analog input quantity $y_e$ is converted by the analog-digital converter 2 into a digital value which is stored in the intermediate store 3. Then the analog input quantity $x_e$ is fed, by means of changing over input switch 1, to the analog-digital converter 2 and is converted there into a digital value. This digital value of $x_e$ remains stored in the counter of the analog-digital converter 2. As explained above, with the help of the $x_e$-value present in the counter of the analog-digital converter 2, it is possible to determine in the x-coordinator 4 the x coordinates the median points which are adjacent to the value $x_e$. The y coordinates of the median points adjacent to the value $y_e$ are selected, as also explained above, by the coordinator 5 which is controlled by the $y_e$-value present in the intermediate store 3. The motor 6 of the reading device 7 is controlled by the output signal of the coordinator 4, said motor sets the information carrier arranged within the reading device 7 to the x coordinates of the adjacent smaller value $x$ . All the z-values $z(x_\nu, y_o)$ to $z(x_\nu, y_m)$ are stored under these x coordinates. The gate circuit 8 is so controlled by the y coordinator 5 that only the two z-values which are associated with the two y coordinates being adjacent to the value $y_e$ are applied to the interpolation device 9 to 18. The value $z(x_\nu, y_\mu)$ is registered in the backward counter 10 via the receiver/transfer circuit 9. At the same time, the value $z(x_\nu, y_{\mu+1})$ is registered in the backward counter 11. It will be assumed here that $z(x_\nu, y_{\mu+1})$ is greater than $z(x_\nu, y_\mu)$.

Then begins the determination of the first interpolation value. The control device 12 produces counting impulses which simultaneously are delivered to the forward counter 13 and to the two backward counters 10 and 11. This delivery of counting impulses is made finished when the backward counter 10 is in the zero condition. Then the value $z(x_\nu, y_\mu)$ is present in the forward counter 13, whilst the difference $z(x_\nu, y_{\mu+1}) - z(x_\nu, y_\mu)$ is present in the backward counter 11. The cross-coupling resistance of the interpolator 14 is set with this difference. In the forward counter 13, there is now a digital value which corresponds to the value $z(x_\nu, y_\mu)$.

The counter in the analog-digital converter 2 and the intermediate store 3, which contain the digital values $x_e$ and $y_e$, each comprise several stages. The content of the most significant stages is denoted as the coarse value and serves to control the coordinators 4 and 5. The content of the remaining, less significant stages is denoted as the fine value. In order to increase the accuracy, interpolation only is carried out for the fine values. At first the content of the fine-value stages of the store 3 is converted into an analog quantity by digital-analog converter 15. At the output of this converter 15, there is then an analog quantity for disposal which corresponds to the fine value of $y_e$.

The control device 12 now produces further counting impulses which are delivered to the forward counters 13 and 16. The forward counter 16 adjusts the input resistance of the interpolator 14. With that, a step voltage is produced at the output of the interpolator 14, the gradient of said step voltage being inversely proportional to the difference $z(x_\nu, y_{\mu+1}) - z(x_\nu, y_\mu)$. This step voltage and the analog output voltage of the digital-analog converter 15 corresponding to the fine value of $y_e$ are compared with one another in the comparator 17. If the two voltages are equal, the counting impulses for forward counters 16 and 13 are stopped. In the forward counter 13 there is now the sum of two impulse series, of which the first impulse series correspond to the value $z(x, y_\mu)$ and the second impulse series to $$\frac{z(x_\nu, y_{\mu+1}) - z(x_\nu, y_\mu)}{y_{\mu+1} - y_\mu} \cdot (y_e - y_\mu)$$

so that, corresponding to the above mentioned first interpolation, in the counter 13 the value $z(x_\nu, y_e)$ is present in digital form (see FIG. 4). This value is now transferred from the counter 13 to the store 18 and stored there for the determination of the third interpolation value.

The determination of the second interpolation value (see FIG. 5) is performed in the same way as the determination of the first interpolation value described above, but is now originated from the pair of output quantities $z(x_{\nu+1}, y_\mu)$ and $z(x_{\nu+1}, y_{\mu+1})$ and the interpolation value $z(x_{\nu+1}, y_e)$ results in the counter 13.

The determination of the third interpolation value again is performed in the same way as the determination of the first and second interpolation values, but is now originated from the pair of values stored in the store 18 and the counter 13. The larger value $z(x_{\nu+1}, y_e)$ is transferred from the counter 13 to the backward counter 11 via the receiver/transfer circuit 9, and the smaller value $z(x_\nu, y_e)$ from the store 18 to the backward counter 10 via the receiver/transfer circuit 9. The further determination of the third interpolation value is performed like the determination of the first interpolation value described above. At the end, the desired output quantity $z(x_e, y_e)$ is in the counter 13. At the same time as the desired output quantity $z(x_e, y_e)$ is counted into the counter 13, the counting impulses, as an impulse series representing the desired output quantity $z(x_e, y_e)$, can be delivered via an output circuit to a consumer device 20 connected with said output (device 20 is not a part of the present calculating machine).

The information carrier storing the z-values can only store these values on the median points with a presupposed accuracy of e.g. seven bits. Thus with greater ranges, a greater inaccuracy arises at small z-values not fulfilling all said seven bits. In order to increase the accuracy also with said small z-values, a so-called range changing over is provided. For that the values stored on said information carrier are partly integer-multiples of the real z-values, i.e. the values on the information carrier are products of the real z-values and multiplication factors of e.g. 1; 2; 5 or 10. For example, an information carrier with a storage capacity of seven bits per value can store values from 0 to 127. Therefore, if real z-values which are smaller than ½·127 are to be stored, then they are stored in form of products of the real z-values multiplied by the factor 2. Therewith a better accuracy of the stored values is given, said accuracy being higher by the factor 2. Correspondingly the real z-values are handled which are smaller than 1/5·127 or 1/10·127; these values are stored in form of products of the real z-values multiplied by the factor 5 or 10.

The output impulses before their delivery out of the calculating machine are then divided by a factor corresponding to the respective multiplication factor by means of an impulse frequency divider provided within control circuit 12, so that the correct values $z(X_e, y_e)$ are given out, e.g. to a device 20 connected with the output.

The ranges of the different multiplication factors are marked on the information carrier and these markings are read by reading device 7. The markings control range changeover switch 19 which adapts the division factor of said impulse frequency divider to the multiplication factor belonging to the read marking. However it is to point out, that all four z-values for said three interpolations must be taken from the same range, and therefore on the range limits for example one line of z-values must be stored two times, one time for the one and one time for the other range.

I claim:

1. An electronic calculating machine for determination of a desired output quantity $z(x_e, y_e)$ which is related to a first given input quantity $x_e$ variable within the limits $x_o$ to $x_n$ and to a second given input quantity $y_e$ variable within the limits $y_o$ to $y_m$, comprising in combination: a first store storing permanently for each individual one of a series of fixed values $x_o$ to $x_n$ of the first input quantity the output quantities $z(x, y)$ for a series of fixed values $y_o$ to $y_m$ of the second input quantity;

first means including a reading device controlled by the input quantities for reading out from the first store the output quantities $z(x_\nu, y_\mu)$ and $z(x_{\nu+1}, y_\mu)$, each related to one of the fixed values $x_\nu$ and $x_{\nu+1}$ lying next below and next above respectively the first input quantity $x_e$ and to the fixed value $y_\mu$ lying next below the second input quantity $y_e$, and for reading out from the first store the output quantities $z(x_\nu, y_{\mu+1})$ and $z(x_{\nu+1}, y_{\mu+1})$ each related to one of the fixed values $x_\nu$ and $x_{\nu+1}$ and to the fixed value $y_{\mu+1}$ lying next above the second input quantity $y_e$;

second means including an interpolation device coupled to said reading device and responsive to said readout for forming, with the aid of the two input quantities $x_e$, $y_e$ and of the four fixed values $x_\nu$, $x_{\nu+1}$, $y_\mu$, $y_{\mu+1}$ and of the four output quantities $z(x_\nu, y_\mu)$, $z(x_{\nu+1}, y_\mu)$, $z(x_\nu, y_{\mu+1})$, $z(x_{\nu+1}, y_{\mu+1})$ taken from the first store, according to one of the two linear interpolation functions $z(\xi_e, \eta) = z(\xi_k, \eta) + \alpha(\xi_e - \xi_k)$ and $z(\xi_e, \eta) = z(\xi_{k+1}, \eta) - \alpha(\xi_{k+1} - \xi_e)$, wherein $\alpha$ is equal to $(\{z(\xi_{k+1}, \eta) - z(\xi_k, \eta)\}$ $(\xi_{k+1} - \xi_k))$ and $\xi$ equals one of $x$ and $y$ and $k$ is the respective one of $\nu$ and $\mu$ while $\eta$ equals the other of $x$ and $y$, as a first interpolated value one of the two values $z(x_\nu, y_e)$ and $z(x_e, y_\mu)$ related to one of the fixed values $x_\nu$ and $y_\mu$ and to one of the input quantities $y_e$ and $x_e$, by linear interpolation between the two output quantities of that one of the two pairs of output quantities $z(x_\nu, y_\mu)$, $z(x_\nu, y_{\mu+1})$ and $z(x_\nu, y_\mu)$, $z(x_{\nu+1}, y_\mu)$ related to the same fixed value as the first interpolated value and as a second interpolated value that one of the two values $z(x_{\nu+1}, y_e)$ and $z(x_e, y_{\mu+1})$ related to the same input quantity as the first interpolated value by linear interpolation between the two output quantities of that one of the two pairs of output quantities $z(x_{\nu+1}, y_\mu)$, $z(x_{\nu+1}, y_{\mu+1})$ and $z(x_\nu, y_{\mu+1})$, $z(x_{\nu+1}, y_{\mu+1})$ relates to the same fixed value as the second interpolated value and as a third interpolated value the value $z(x_e, y_e)$ by linear interpolation between the first and the second interpolated values; said interpolation device including means for giving out the third interpolated value $z(x_e, y_e)$ as the desired output quantity.

2. A calculating machine as claimed in claim 1, wherein the output quantities $z(x_o, y_o)$ to $z(x_n, y_m)$ are stored in form of digital values in the first store.

3. A calculating machine as claimed in claim 1, wherein the output quantities are stored in at least one marked zone of the first store in the form of integer-multiples of their real values, said means for giving out including a line over which the third interpolation value is lead in the form of an impulse series and at least one impulse frequency divider switchable into said line thereby causing an impulse division factor corresponding to said integer of said integer-multiple, said switching in of said pulse frequency divider being controlled by said zone markings.

4. A calculating machine as claimed in claim 1, wherein the first store comprises a replaceable information carrier, thus permitting change of the relationship between the output and input quantities.

5. A calculating machine as claimed in claim 4, wherein the output quantities are stored on the replaceable information carrier in form of binary groups and the information carrier has transparent and opaque areas as binary positions.

6. A calculating machine as claimed in claim 4, wherein the replaceable information carrier has the form of a flat information carrier on which the output quantities $z(x_o,y_o)$ to $z(x_n,y_m)$ are stored in form of a plurality of lines arranged one below the other and of a plurality of columns arranged one beside the other, each line comprising all output quantities related to a certain one of the fixed values of one of the two input quantities and to all the fixed values of the other of the two input quantities, the output quantities being arranged on each line in the succession of said fixed values of the other of the two input quantities, and each column comprising all output quantities related to a certain one of the fixed values of said other of the input quantities and to all the fixed values of said one of the input quantities, the output quantities being arranged on each column in the succession of said fixed values of said one of the input quantities.

7. A calculating machine as claimed in claim 6, wherein the reading device comprises a number of groups of reading members arranged relatively to each other in one of the two directions comprising line direction and column direction, each group of reading members being adapted to read one output quantity and all groups of reading members together being adapted to read all output quantities related to a certain one of the fixed values of one of the two input quantities, said first means further including control means for the reading device comprising firstly a first coordinator and a motor controlled by said first coordinator for moving the information carrier relatively to the reading members in the other of said two directions and for applying the two series of output quantities related to one of the two pairs of fixed values $x_\nu$, $x_{\nu+1}$ and $y_\mu$, $y_{\mu+1}$, one series after the other, to the reading members, said control means comprising secondly a second coordinator and a gate circuit controlled by said second coordinator for connecting the two groups of reading members related to the other of said two pairs of fixed values $x_\nu$, $x_{\nu+1}$ and $y_\mu$, $y_{\mu+1}$ to the interpolation device.

8. A calculating machine as claimed in claim 6, wherein the reading device comprises four groups of reading members, each said group being adapted to read one output quantity and said groups together being adapted to read two output quantities occurring one after the other in the same line and the two output quantities in the said columns of the next line, said first means further including control means for the reading device and first comprising a first coordinator and a first motor controlled by said first coordinator for moving the information carrier relatively to the reading member in the column direction and for applying the line of output quantities related to one of the both fixed values $x_\nu$ and $y_\mu$ to the two groups of reading members forming the first line of reading members and second comprising a second coordinator and a second motor controlled by said second coordinator for moving the information carrier relatively to the reading members in the line direction and for applying the column of output quantities related to the other of both fixed values $x_\nu$ and $y_\mu$ to the two groups of reading members forming the first column of reading members.

9. A calculating machine as claimed in claim 1, wherein the output quantities permanently stored in the first store are related to fixed values $x_o$ to $x_n$ of the first input quantity following one another in equal intervals $\Delta x = x_{\nu+1} - x_\nu$ and to fixed values $y_o$ to $y_m$ of the second input quantity following one another in equal intervals $\Delta y = y_{\mu+1} - y_\mu$ so that the divisor $(\xi_{k+1} - \xi_k)$ in the quotient $(z(\xi_{k+1},\eta) - z(\xi_k,\eta)) \nu (\xi_{k+1}-\xi_k))$ forming said factor $a$ is a constant which is independent of $k$ and equals $\Delta x$ for $\xi$ representing $x$ and equals $\Delta y$ for $\xi$ representing $y$.

10. A calculating machine as claimed in claim 9, further including input means for receiving the analog input quantity $x_e$ and the analog input quantity $y_e$; at least one analog/digital converter coupled to said input means for converting the analog input quantities into multi-digit digital values; means coupled to said converter for splitting, in a similar manner as the splitting of a decimal fraction by a decimal point into a whole number having at least one digit and the decimal places, each of the multi-digit digital values into a digital coarse value formed by at least one significant digit and a digital fine value formed by the remainder of the digits of said multi-digit digital value; said output quantities permanently stored in the first store being each related firstly to one of the fixed values $x_o$ to $x_n$ which follow one another at equal intervals $\Delta x$, each of these intervals $\Delta x$ corresponding to one unit of the least significant digit of the digital coarse value of the first input quantity, said output quantities being each related secondly to one of the fixed values $y_o$ to $y_m$ which follow one another at equal intervals $\Delta y$, each of these invervals $\Delta y$ corresponding to one unit of the least significant digit of the digital coarse value of the second input quantity, where n is equal to the maximum value of the digital coarse value of the first input quantity and m is equal to the maximum value of the digital coarse value of the second input quantity;

said first means including control means coupled to the reading device and controlled by the digital coarse values of said first and second input quantifies for setting the reading device, with a digital coarse value of the first input quantity and a digital coarse value of the second input quantity, one of the two series of output quantities related to one of the two pairs of fixed values $x$, $y_{+1}$ and $y$, $y_{+1}$, said control means including a first coordinator for carrying out said setting, said control means further including a second coordinator for then extracting from these two series of output quantities the two pairs of output quantities related to the other of said two pairs of fixed values $x$, $x_{+1}$ and $y$, $y_{+1}$;

said first means also including means for transferring to the interpolation device the extracted pairs of output quantities from said control means and further the digital fine value of the first input quantity formed by the digital value of the difference $(x_e-x)$ and the digital fine value of the second input quantity formed by the digital value of the difference $(y_e-y)$.

11. A calculating machine as claimed in claim 10, wherein $n$ is equal to $m$.

12. A calculating machine as claimed in claim 10, wherein $\Delta x$ is equal to $\Delta y$.

13. A calculating machine as claimed in claim 12, in which said analog/digital converter is arranged for firstly converting the analog value of the one input quantity and secondly converting the analog values of the other input quantity into multi-unit digital values as well as for storing the finally obtained multi-unit digital value until its further manipulation within the calculating machine; said first means including first connecting means between the coarse value positions of the digital output of the analog/digital converter and the input of the first coordinator for the transfer of the digital coarse value of the multi-unit digital value secondly determined by the analog/digital converter to the first coordinator;

said means for splitting including a second store for storing the multi-unit digital value firstly determined by the analog/digital converter as well as for storing the digital fine value of the multi-unit digital value secondly determined by the analog/digital converter after the storing of the multi-unit digital value firstly determined by the analog/digital converter;

said first means further including second connecting means between the digital output of the analog/digital converter and the input of the second store for transferring from the analog/digital converter to the second store the multi-unit digital value firstly determined by the analog/digital converter and the digital fine value of the multi-unit digital value secondly determined by the analog/digital converter;

said first means further including third connecting means between the coarse value positions of the output of the second store and the input of the second coordinator for transferring the digital coarse value of the multi-unit digital value firstly determined by the analog/digital converter to the second coordinator;

said means for transferring including fourth connecting means between the fine value positions of the output of the second store and the interpolation device for transferring the fine digital values of the multi-unit digital values determined by the analog/digital converter to the interpolation device.

14. A calculating machine as claimed in claim 10, wherein the interpolation device includes the following elements a receiver/transfer circuit connected with the means for transferring the pairs of output quantities extracted from the first store; a first backward counter having a setting input connected with the receiver/transfer circuit, into which first backward counter the smaller value of a pair of values forming the interpolating limits of the interpolation being carried out is transferred by the receiver/transfer circuit; a second backward counter having a setting input connected with the receiver/transfer circuit, into which second backward counter the large value of a pair of values forming the interpolating limits of the interpolation being carried out is transferred by the receiver/transfer circuit; a first forward counter having an output connected with the receiver/transfer circuit, for determining the interpolation value of the interpolation being carried out; a third store having an input connected with the output of the first forward counter and having an output connected with the receiver/transfer circuit for storing the first interpolation value during the determination of the second interpolation value; a second forward counter, an interpolator for the production of a step voltage increasing linearly with the state of count of the second forward counter; connecting means between a first control input of the interpolator, provided for setting the mean increase of the step voltage, and the output of the second backward counter as well as between a second control input of the interpolator, provided for the step-by-step increment of the step voltage, and the output of the second forward counter; a digital/analog converter having an input connected with the means for transferring the digital fine values of the first and second input quantities; a comparator having one input connected with the output of the interpolator and another input connected with the output of the digital/analog converter, for comparing the output step voltage of the interpolator with the output voltage of the digital/analog converter; and a control circuit including a counting pulse generator, which control circuit is connected with the output of the comparator and with the counting inputs of the both forward counters and of the both backward counters and with the output of the first backward counter and with a control input of the receiver/transfer circuit.

15. A calculating machine as claimed in claim 14, wherein the interpolator comprises a voltage amplifier with variable amplification factor and variable input voltage, the amplification factor of which is adjustable by the second backward counter and the input voltage of which is adjustable by the second forward counter.

16. A calculating machine as claimed in claim 14, wherein the control circuit comprises means for connecting at the beginning of the formation of the third interpolation value an output lead in parallel with the counting input of the first forward counter over which the third interpolation value forming the desired output quantity is deliverable out of the calculating machine in form of an impulse series.

* * * * *

UNITED STATES PATENT OFFICE
CERTIFICATE OF CORRECTION

Patent No. 3,725,684          Dated April 3, 1973

Inventor(s) Rudolf K. H. Panschow

It is certified that error appears in the above-identified patent and that said Letters Patent are hereby corrected as shown below:

On the Abstract page, in the line before "Filed" insert --Assignee; SINA AG, Zurich, Switzerland--.; in the line before "U.S. Cl." insert --Foreign Application Priority Data, December 16, 1967, Germany .. S 113 353 IXc/42m4.--. In the Abstract, line 18, change "$(x_\nu+^1, Y_\mu)$" to --$(x_{\nu+1}, Y_\mu)$--.; line 20, delete "guantities" and insert --quantities--. Column 2, line 5, change "$y_3$" to --$y_e$--.; line 22, after "}" insert --÷-- and after ")" delete ")" and insert --;--.; line 24, change "valve" to --value--. Column 4, line 18, delete the underlining above "$z\ (x_{\nu+1}, Y_{\mu+1}) - z(x_{\nu+1}, Y_\mu)$". Column 5, line 31, delete "0" after "=". Column 7, line 23, delete "is," and insert --that--.; line 50, change "$(5, Y_0)$" to --$(x_5, Y_0)$--. Column 8, line 42, change "$(x_6, aY_e)$" to --$(x_6, Y_e)$--. Column 9, line 62, after "}" insert --÷--. Column 10, line 28, change "an" to --the--.; change "and the" to --and an--.; line 58, change "ax" to --$\Delta x$--. Column 11, line 9, after "circuit" insert --9--.; line 43, after "z-values" insert --within the--. Column 13, line 46, change "at" to --of--. Column 14, line 13, delete "x ." and insert --$x_\nu$.--. Column 16, line 43, "$(\{z(\xi_{k+1},\eta) -z\ (\xi_k,\eta)\}\ (\xi_{k+1}-\xi_k)$" should read --$(\{z(\xi_{k+1},\eta) -z\ (\xi_k,\eta)\}\div(\xi_{k+1}-\xi_k)$--. Column 18, line 2, "said columns" should read --same columns--.; line 26, "$(z(\xi_{k+1},\eta) -z\ (\xi_k,\eta) \vee (\xi_{k+1}-\xi_k))$" should read --$(\{z\ (\xi_{k+1},\eta)$

UNITED STATES PATENT OFFICE
CERTIFICATE OF CORRECTION

Patent No. 3,725,684           Dated April 3, 1973

Inventor(s) Rudolf K. H. Panschow

It is certified that error appears in the above-identified patent and that said Letters Patent are hereby corrected as shown below:

$-z(\xi_k, \eta)\} \div (\xi_{k+1} - \xi_k)$ --; line 62, "value of" should read --value $\nu$ of--; line 63, "value of" should read --value $\mu$ of--; line 65, "x, $Y_{+1}$ and y, $Y_{+1}$," should read $--x_\nu$, $x_{\nu+1}$, and $Y_\mu$, $Y_{\mu+1}$,--. Column 19, lines 4 and 5, "x, $Y_{+1}$ and y, $Y_{+1}$," should read $--x_\nu$, $x_{\nu+1}$ and $Y_\mu$, $Y_{\mu+1}$,--; line 11 "$(x_e - x)$" should read $--(x_e - x_\nu)$--; line 13, change "$(y_e - y)$" to $--(y_e - y_\mu)$--.

Signed and sealed this 29th day of October 1974.

(SEAL)
Attest:

McCOY M. GIBSON JR.                C. MARSHALL DANN
Attesting Officer                  Commissioner of Patents